(12) United States Patent
Jodet et al.

(10) Patent No.: US 11,000,964 B2
(45) Date of Patent: May 11, 2021

(54) DEVICE FOR PERFORATING AN ACOUSTIC ANNULAR PANEL FOR A TURBINE ENGINE

(71) Applicant: SAFRAN AIRCRAFT ENGINES, Paris (FR)

(72) Inventors: Norman Bruno Andre Jodet, Mason Alfort (FR); Laurent Louis Robert Baudoin, Paris (FR); Jeremy Paul Gonzalez, La Chapelle Rablais (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/963,985

(22) Filed: Apr. 26, 2018

(65) Prior Publication Data
US 2018/0311859 A1    Nov. 1, 2018

(30) Foreign Application Priority Data
Apr. 27, 2017  (FR) ........................................ 1753695

(51) Int. Cl.
*B26F 1/24*     (2006.01)
*B26F 1/00*     (2006.01)
(Continued)

(52) U.S. Cl.
CPC .............. *B26F 1/24* (2013.01); *B26F 1/0038* (2013.01); *B32B 3/12* (2013.01); *B32B 3/266* (2013.01);
(Continued)

(58) Field of Classification Search
CPC ........ B26F 1/0038; B26F 1/24; B21D 28/285; B21D 28/28; B21D 28/36; B23D 21/14
(Continued)

(56) References Cited

U.S. PATENT DOCUMENTS 1,382,939 A * 6/1921 Spade ...................... B23D 5/02
409/306
1,502,097 A * 7/1924 Grace ................... B21D 28/30
83/184
(Continued)

FOREIGN PATENT DOCUMENTS

EP        1683615 A1      7/2006
FR        2407812 A1 *    6/1979    ............... B26D 3/16
(Continued)

OTHER PUBLICATIONS

FR2437288 English Translation 004-1980 Semplanor B26F1/0038.*

(Continued)

*Primary Examiner* — Laura M Lee
(74) *Attorney, Agent, or Firm* — Womble Bond Dickinson (US) LLP

(57) ABSTRACT

Device for perforating an acoustic annular panel for a turbine engine, wherein it includes a perforation needle support ring, the ring having an axis A of revolution and being intended to be inserted substantially coaxially inside the panel, the ring being sectored and including ring sectors regularly distributed around the axis and each one radially mobile opposite the axis from a radially inner rest position up to a perforation position of the radially outer panel, and at least one rotating actuator of rotation axis A and mechanically connected to the ring sectors such that a rotation of the actuator leads to a radial movement of the ring sectors.

11 Claims, 1 Drawing Sheet

(51) Int. Cl.
*F02C 7/045* (2006.01)
*B32B 3/26* (2006.01)
*B32B 3/12* (2006.01)
*B32B 27/08* (2006.01)

(52) U.S. Cl.
CPC .............. *B32B 27/08* (2013.01); *F02C 7/045* (2013.01); *B32B 2260/021* (2013.01); *B32B 2262/106* (2013.01); *B32B 2307/102* (2013.01); *B32B 2605/18* (2013.01); *F05D 2220/323* (2013.01); *F05D 2230/50* (2013.01); *F05D 2260/96* (2013.01)

(58) Field of Classification Search
USPC ....................................................... 83/54, 178
See application file for complete search history.

(56) References Cited

U.S. PATENT DOCUMENTS

| | | | | |
|---|---|---|---|---|
| 2,279,211 | A * | 4/1942 | Thomas | B26F 1/02 83/185 |
| 2,419,534 | A * | 4/1947 | Burleson | B21D 28/28 83/194 |
| 2,423,791 | A * | 7/1947 | Nelson | B21D 28/30 83/144 |
| 3,259,003 | A * | 7/1966 | Griffin | B21D 28/28 83/54 |
| 3,316,787 | A * | 5/1967 | Lambro | B21D 28/28 83/109 |
| 4,254,075 | A | 3/1981 | Menzel et al. | |
| 4,270,878 | A * | 6/1981 | Fales | E02B 11/005 409/143 |
| 2002/0139228 | A1* | 10/2002 | Johnston | B26D 7/08 83/13 |
| 2003/0080233 | A1* | 5/2003 | Von Paleske | B26F 1/0038 242/532 |
| 2010/0126971 | A1* | 5/2010 | Calder | B23K 15/0006 219/121.18 |

FOREIGN PATENT DOCUMENTS

| | | | | |
|---|---|---|---|---|
| FR | 2437288 | A2 * | 4/1980 | ............ B26F 1/0038 |
| JP | 2004174706 | A | 6/2004 | |

OTHER PUBLICATIONS

Safran Aircraft Engines, "French Preliminary Search Report," FR Application No. 1753695 (dated Dec. 15, 2017) (with English translation cover sheet).

* cited by examiner

DEVICE FOR PERFORATING AN ACOUSTIC ANNULAR PANEL FOR A TURBINE ENGINE

TECHNICAL FIELD

The present invention relates to a device for perforating an acoustic annular panel for a turbine engine. A method for perforating an acoustic annular panel for a turbine engine is also related.

STATE OF THE ART

The state of the art in particular comprises documents U.S. Pat. No. 4,254,075, JP-A-2004/174706A and EP-A1-1 683 615.

Generally, a turbine engine acoustic panel comprises a layered or sandwiched structure comprising two skins, respectively inner or lower, and outer or upper, between which an alveolar structure, for example, a honeycomb structure, extends. The cells of the structure extend in two directions, parallel and substantially perpendicular to the skins, which close these cells at two opposite ends. One of the skins in generally flat, in other words non-porous, so as to have noise-reflective properties, and the other of the skins, situated generally on the side of the noise to be diminished, is porous or perforated, so as to ensure the transmission and the dissipation of the acoustic waves. It is known that the acoustic processing properties of such a panel, in particular depends on the thickness and the level of porosity of the perforated skin thereof.

This type of panel can be, for example, used to line the inner surface of a casing surrounding a turbine engine blower, such that the noises emitted by the functioning blower are at least, in part, absorbed by the panel, which limits the noise pollution for passengers of the aircraft equipped with this turbine engine.

The skins of the panel are generally constituted of carbon fibres, pre-impregnated with a polymerisable resin. The alveolar structure is pressed against the skins at the time of cooking, to obtain a solid, rigid and resistant unit.

One of the skins can be made porous in several ways:
- after the hardening of the resin, a "mechanical" boring system is used, based for example on the abrasive action of rotating drills,
- during the hardening of the resin, the needles are positioned through the carbon fibre lattice, before cooking the resin. In this way, the carbon fibres are removed so as to occupy the desired space. By removing the needles after hardening the resin, micro-perforations are obtained, which give the desired characteristic of porosity to the skin.

The second micro-perforation method is broadly favoured for cost and operational tempo reasons. It is currently implemented for making turbine engine acoustic panels.

However, this method has limitations:
- the method is only currently applicable for panel sectors or segments, which have an angle range less than 90°. Indeed, it is not possible to currently apply this method to perforate an annular panel continuously extending over 360°.
- for a 60° panel segment, the angle variation of the bores will be +/−30°, which disadvantages the effectiveness of the panel. The more the angle section is covered by one single panel, the more the quality of the micro-perforation will be impaired, because of the diversities connected to the angle differences during the insertion of each needle in the carbon fibre lattice. The acoustic effectiveness of the panel then finds itself impaired, as the sizing of the perforations is a major parameter to guarantee this effectiveness.

The present invention proposes a solution to this problem, which is simple, effective and economic.

DESCRIPTION OF THE INVENTION

The invention proposes a device for perforating an acoustic annular panel for a turbine engine, characterised in that it comprises:
- a perforation needle support ring, said ring having an axis A of revolution and being intended to be inserted substantially coaxially inside said panel, said ring being sectored and comprising ring sectors regularly distributed around said axis and each one radially mobile opposite the axis from a radially inner rest position up to a perforation position of the radially outer panel, and
- at least one rotating actuator of rotation axis A and mechanically connected to said ring sector such that a rotation of the actuator leads to a radial movement of the ring sectors.

The invention enables to perforate an annular panel, which was not possible with the prior art. This is made possible by using a perforation needle support sectored ring and by radial movements of the ring sectors from an inner rest position up to a perforation position of the radially outer panel.

The device according to the invention can comprise one or more of the following characteristics, taken by themselves or combined with each other:
- the actuator is connected to said sectors by connecting means, configured such that each ring sector is radially moved in a non-synchronised way in relation to the adjacent ring sectors;
- the connecting means are configured such that each ring sector is radially moved at a different speed to those of the adjacent ring sectors;
- the connecting means comprise slotted link systems and/or sliders;
- the ring sectors support the perforation needles on the radially outer surfaces;
- the device further comprises an annular support of said panel, said support being intended to be surrounded by the panel;
- said annular support comprises substantially radial orifices for the passage and guiding of said needles;
- the number of ring sectors is even and is higher than or equal to four.

The present invention also relates to a method for perforating an acoustic annular panel for a turbine engine, by using a device such as defined above, characterised in that it comprises steps consisting in:
- arranging the annular panel to be perforated around said support,
- inserting the ring sectors inside said panel,
- rotating the actuator so as to move the ring sectors from their rest position up to their perforation position, the needles being guided in the support orifices before their passage from the panel.

Advantageously, the ring sectors comprise a first series of sectors, regularly distributed around the axis A and a second series of sectors, regularly distributed around the axis A and interleaved between the sectors of the first series. The sectors of the first series are moved at a different speed to those of the sectors of the second series.

DESCRIPTION OF THE FIGURES

The invention will be best understood, and other details, characteristics and advantages of the invention will appear more clearly upon reading the following description, made as a non-limitative example and in reference to the appended drawings wherein.

DETAILED DESCRIPTION

Figure 1:
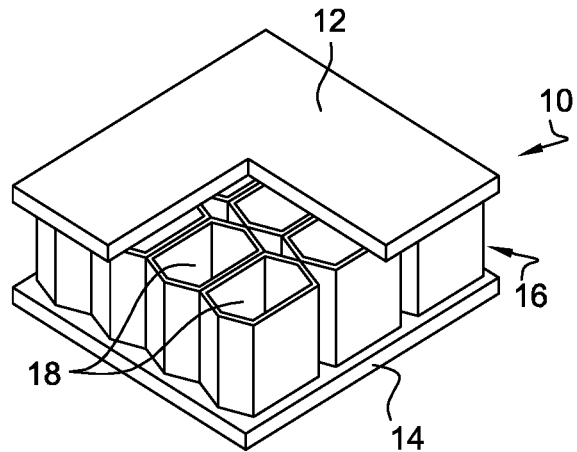
FIG. 1 is a schematic view of an example of an embodiment of an acoustic panel, in particular, a turbine engine acoustic panel.

FIG. 1 represents an acoustic panel 10 which can, for example, be used for acoustic processing in a turbine engine. In this case, it is used to line an inner surface of a casing, for example.

An acoustic panel 10 comprises a layered structure comprising two skins, respectively inner 12 and outer 14, between which an alveolar structure 16 extends, which is the honeycomb type in the example represented. The cells 18 of the structure 16 extend in directions, parallel and substantially perpendicular to the skins 12, 14, which close these cells at the inner and outer ends.

The outer skin 14 is full and noise-reflective, and the inner skin 12 is perforated so as to ensure the transmission and dissipation of the acoustic waves.

Figure 2:
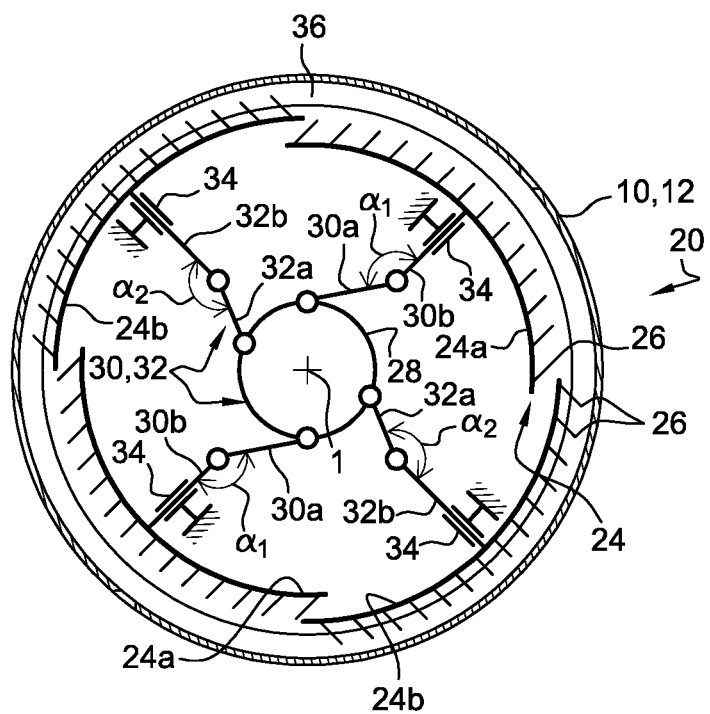
FIG. 2 is a very schematic view of an example of an embodiment of a device according to the invention of perforating an acoustic annular panel.
Figure 3:
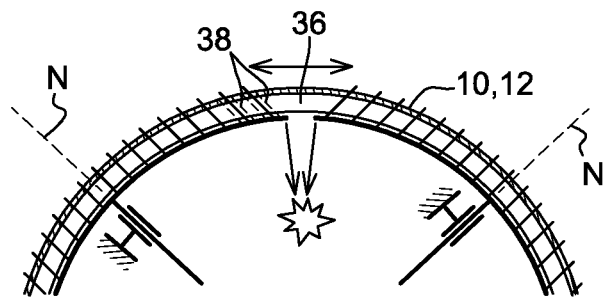
FIG. 3 is a larger scale, very schematic view of a part of the example of an embodiment of the device in FIG. 2.

FIGS. 2 and 3 represent an example of an embodiment of a device 20 according to the invention for perforating an annular panel 10 or an inner wall 12 therefore extending continuously over 360° around the axis of revolution A thereof.

In the example represented, the device 20 comprises:
a perforation needle 26 support sectored ring 24,
a rotation axis A rotating actuator 28, and
means 30, 32 for mechanically connecting the actuator 28 to the ring 24.

The ring 24 comprises the sectors 24a, 24b arranged circumferentially end-to-end. The number of sectors 24a, 24b is preferably even and higher than or equal to four. In the example represented, this number is four and each sector has an angle range of around 90°.

Each sector comprises an inner cylindrical surface and an outer cylindrical surface, the latter supporting the needles 26 which extend radially towards the outside in relation to the axis A. The density, the section shape and the dimension of the needles 26 are determined according to the porosity characteristics desired for the inner skin of the panel 10.

To facilitate the insertion and the withdrawal of the needles from the panel 10, it is preferable that the needles of a same ring sector 24a, 24b are parallel and for example also parallel to a norm N at their outer surface situated halfway from the circumferential ends of the sector (see FIG. 2). Thus, as can be seen in FIG. 3, the needles of a ring sector 24a, 24b do not risk coming into contact with the needles of the adjacent sectors during the actuation of the device 20. The needles situated at the circumferential end of a ring sector 24a, 24b are thus tilted in relation to those situated at the circumferential end opposite an adjacent ring sector 24a, 24b (see FIG. 3), even if a circumferential part of the panel could not be perforated in the inter-sector zones. The circumferential size of this part can, for example, be reduced by increasing the number of sectors composing the ring. The increase in the number of sectors further enables to reduce the tilt angle of the needles at the level of the above-mentioned circumferential ends of two adjacent sectors.

The actuator 28 has a generally cylindrical shape and is arranged radially inside the ring sectors 24a, 24b by being aligned over the axis A. It is rotated by suitable control means, in one direction or in the other direction around the axis A. The actuator can, for example, comprise an inner, grooved drilling, engaged with a grooved shaft of an engine.

The connecting means 30, 32 here comprise slotted link systems. Each ring sector 24a, 24b here is connected to the actuator by a slotted link system, comprising a connecting rod 30a or 32a and a crank 30b or 32b. The connecting rod 30a or 32a has a radially inner end connected by a pivot connection to the actuator 28, and a radially outer end connected by a pivot connection to a radially inner end of the crank 30b or 32b. The radially outer end of the crank 30b, 32b is connected to the inner cylindrical surface of a ring sector 24a, 24b. The pivot connections here have hinge axes parallel to each other and to the axis A. The cranks 30b, 32b are guided forward radially in the secured sliders 34.

Each ring sector 24a, 24b can be moved radially from a radially inner rest position up to a perforation position of the radially outer panel. It is now understood, that the needles 26 of the ring sectors do not cross the panel 10 in the rest position and cross the panel in the perforation position.

The radial movement of the ring sectors is caused by rotating in a direction of the actuator, the slotted link systems transforming the rotation of the ring into a radial forward-movement of the sectors. In the rest position, the slotted link systems each form an angle α1 and, in the perforation position, they each form an angle α2 which is higher than α1. The angles α1 and α2 of a system can be different from those of the adjacent systems.

The slotted link systems are preferably configured such that each ring sector 24a, 24b is moved radially in a non-synchronised way in relation to the adjacent ring sectors. More specifically, in the example represented, each ring sector 24a, 24b is moved radially at a different speed from that of the adjacent ring sectors. The ring sectors are arranged in two series, a first series of two diametrically opposite sectors and a second series of two diametrically opposite sectors, interleaved between the sectors of the first series.

The sectors 24 of the first series are each connected by the connecting rod 30a and the crank 30b to the actuator and the sectors 24b of the second series are each connected by the connecting rod 32a and the crank 32b to the actuator. The connecting rods 30a have a different (and here longer) length to that of the connecting rods 32a, and the cranks 30b have a different (and here shorter) length to that of the cranks 32b. This enables the sectors 24a of the first series to be moved radially at a different (and here higher) speed to those of the sectors 24b of the second series.

It is thus understood, that after the rotating of the actuator 28, a ring sector 24a, 24b will be driven at a different speed from that of the adjacent ring sectors, which will avoid the circumferential edges of the sectors coming into contact with each other, as is schematically represented in FIG. 3.

To facilitate the holding of the panel 10 and the guiding of the needles during the forward-movement of the ring sectors, the device further comprises an annular support 36 of the panel 10, which extends radially inside the panel, to support it. The support 36 can be used as a frame for the device 20, and support, for example, the above-mentioned sliders 34.

The panel 10 therefore extends around the support 36, the outer skin thereof being intended to rest directly on an inner cylindrical surface of the support 36. Advantageously, the support 36 comprises substantially radial orifices 38 for the passage and guiding of the needles (see FIG. 3).

The perforation of the panel 10, and in particular, of the inner skin 12 thereof, can be made in the following way. The panel 10 is first arranged on the support 36. The panel with the pre-impregnated fibre lattice is therefore positioned supporting on the support. The support can be used as a "mould" for the production of the panel or at least such that it preserves the annular shape thereof, in particular when the perforation operation is carried out before the above-mentioned cooking step. The ring sectors are then inserted inside the support and the panel, the sectors being in their radially inner rest position. The actuator is rotated (clockwise in the example represented) so as to move the ring sectors from their rest position up to their perforation position. Thanks to the different sizing of the connecting means 30, 32, a rotation effect enabling to avoid collision between the sectors is produced. For example, it can be considered that the difference in length between the connecting rods 30a and 32a must be more than 10% to obtain an effective rotation system. An alternative to this system would consist in using two independent actuators to obtain the rotation movement. The sizing of the slotted link system could thus be unique.

The needles cross the orifices for guiding 38 the support 36, then the pre-impregnated fibre lattice. The device 20 is thus locked in this position. The panel 10 can be cooked according to a known practice of the state of the art (contained in a closed system, pressurised and put under a high temperature). Before the end of cooking, the device 20 is unlocked and the actuator 28 is moved, in the reverse direction (anticlockwise) so as to remove the needles from the pre-impregnated fibre lattice. After cooking, the panel is ready and has micro-perforation such as desired. In the case where the inner skin 12 itself would be arranged on the support 36 and perforated, it is after cooking, returned and secured, for example, by gluing, on a unit comprising the outer skin 14 and the structure 16.

The invention claimed is:

1. A device for perforating an acoustic annular panel for a turbine engine, comprising:
    a perforation needle support ring, said ring having an axis A of revolution and being intended to be inserted substantially coaxially inside said panel, said ring being sectored and comprising ring sectors regularly distributed around said axis and each one comprising perforation needles and being radially mobile opposite the axis from a radially inner rest position up to a perforation position wherein said perforation needles cross said panel, said perforation needles of each ring sector being distributed along the angular sector of said ring sector and being parallel to each other, and
    at least one rotating actuator of rotation axis A and mechanically connected to said ring sectors such that a rotation of the actuator leads to a radial movement of the ring sectors.

2. The device according to claim 1, wherein the actuator is connected to said sectors by connecting means, configured such that each ring sector is moved radially in a non-synchronised way in relation to the adjacent ring sectors.

3. The device according to claim 2, wherein the connecting means are configured such that each ring sector is moved radially at different speed to those of the adjacent ring sectors.

4. The device according to claim 2, wherein the connecting means comprise slotted link systems and/or slider.

5. The device according to claim 1, wherein the ring sectors support the perforation needles on the radially outer surfaces.

6. The device according to claim 5, wherein said annular support comprises substantially radial orifices for the passage and guiding of said needles.

7. A method for perforating an acoustic annular panel for a turbine engine, by using a device according to claim 6, comprising:
    arranging the annular panel to be perforated around said support,
    inserting the ring sectors inside said panel,
    rotating the actuator so as to move the ring sectors from their rest position up to their perforation position, the needles being guided in the support orifices before their passage from the panel.

8. The method according to claim 7, wherein, the ring sectors comprise a first series of sectors regularly distributed around the axis A and a second series of sectors regularly distributed around the axis A and interleaved between the sectors of the first series, the sectors of the first series being moved at a different speed to those of the sectors of the second series.

9. The device according to claim 1, further comprising an annular support of said panel, said support being intended to be surrounded by the panel.

10. The device according to claim 1, wherein the number of ring sectors is even and is higher than or equal to four.

11. The device according to claim 1, wherein the perforating needles of each ring sector are parallel to an axis that crosses the ring sector in its middle, halfway from its circumferential ends.

* * * * *